United States Patent [19]

Layne

[11] Patent Number: 5,749,454

[45] Date of Patent: May 12, 1998

[54] CONVEYOR SYSTEM WITH DRIVEN ROLLER TRANSFER ASSEMBLY

[75] Inventor: James L. Layne, Scottsville, Ky.

[73] Assignee: Span Tech Corporation, Glasgow, Ky.

[21] Appl. No.: 642,030

[22] Filed: May 2, 1996

Related U.S. Application Data

[63] Continuation-in-part of Ser. No. 451,614, May 26, 1995, Pat. No. 5,584,373.

[51] Int. Cl.⁶ .................................................. B65G 43/00
[52] U.S. Cl. ................................ 198/464.4; 198/502.1; 198/600; 198/781.01
[58] Field of Search ........................ 198/600, 635, 198/502.1, 464.4, 571–573, 719, 325, 592, 861.5, 781.01, 782

[56] References Cited

U.S. PATENT DOCUMENTS

| | | |
|---|---|---|
| 2,030,103 | 2/1936 | Dunlop . |
| 2,109,210 | 2/1938 | Dunlop . |
| 2,536,961 | 1/1951 | Smith . |
| 2,569,711 | 10/1951 | Foster . |
| 2,624,444 | 1/1953 | Casabona . |
| 2,755,909 | 7/1956 | Crawford . |
| 3,206,001 | 9/1965 | Peppler . |
| 3,240,311 | 3/1966 | Hofer et al. . |
| 3,251,458 | 5/1966 | Niekamp et al. . |
| 3,610,406 | 10/1971 | Fleischauer et al. . |
| 3,853,212 | 12/1974 | Downes . |
| 3,951,255 | 4/1976 | Shuttleworth et al. . |
| 4,313,536 | 2/1982 | Fauth . |
| 4,319,676 | 3/1982 | Turnbough . |
| 4,448,302 | 5/1984 | Weaver et al. . |
| 4,469,220 | 9/1984 | Becker . |
| 5,009,307 | 4/1991 | Chance et al. . |
| 5,215,182 | 6/1993 | Garbagnati . |
| 5,255,771 | 10/1993 | Nurnberg et al. . |
| 5,584,373 | 12/1996 | Layne .................................. 198/600 X |

*Primary Examiner*—D. Glenn Dayoan
*Attorney, Agent, or Firm*—King and Schickli

[57] ABSTRACT

A conveyor system having an improved conveyor transfer assembly is provided for transferring articles from the end of a first conveyor to the start of a second, in-line conveyor. The conveying surface of the transfer assembly is formed by rollers driven by a magnetic coupling system which delivers power from an independent power source. In addition, magnets are used for providing a positive attachment between the conveyor transfer assembly and the conveyor supports which span between the first and second conveyors. Thus, when an article jam occurs adjacent to the transfer assembly, the positive magnet attachment is overcome and, likewise, the magnetic coupling between the power source and the rollers is also overcome thereby releasing the power connection. This allows the transfer assembly to be bodily lifted and released to prevent damage to the articles. The transfer assembly may also contain a tether connected to the frame to restrain and suspend the transfer assembly following its release.

14 Claims, 3 Drawing Sheets

CONVEYOR SYSTEM WITH DRIVEN ROLLER TRANSFER ASSEMBLY

This is a continuation-in-part of U.S. patent application Ser. No. 08/451,614, filed May 26, 1995 and entitled "Conveyor System With Passive Roller Transfer Assembly" now U.S. Pat. No. 5,584,373.

BACKGROUND OF THE INVENTION

The present invention relates generally to conveyors, and more particularly to a conveyor system having a driven transfer assembly positioned between the end of a first conveyor and the start of a second conveyor.

Conveyor systems commonly have two or more conveyors strategically positioned in an end-to-end relationship so as to feed articles along a feed path, these type conveyors being especially beneficial in the food processing or packaging industries. A prevalent and often recurring problem in providing an end-to-end conveyor system is providing a conveyor transfer assembly which not only provides for a smooth transition along a transfer zone, but also can be lifted and released in the event that an article jam occurs. One such conveyor transfer assembly meeting these requirements is disclosed in the Applicant's copending patent application Ser. No. 08/451,614, filed May 26, 1995 and entitled "Conveyor System With Passive Roller Transfer Assembly" now U.S. Pat. No. 5,584,373. Applicant's copending application discloses a releasable conveyor transfer assembly which is freely resting between a first and second conveyor and includes a conveying surface which is either passive, i.e. gravity driven, or active, i.e. positively driven by an independent power source. Thus, while this conveyor transfer assembly, in either the passive or active versions, is already known and proven to be successful, further improvements in the active version are desirable. More particularly, a need exists for an improved means for effectively driving the active version of the conveying surface, while at the same time enhancing the releasability feature.

Various ways for broadly driving conveyor systems are known in the art. One known arrangement is to use an assortment of interconnected belts and pulleys to directly transfer power from a power supply to the conveyor. As an example, U.S. Pat. No. 3,240,311 to Hofer et al, issued Mar. 15, 1966, discloses a driven conveyor system of this type.

Another well known arrangement for broadly supplying a driving force is through the use of magnetic coupling assemblies. For example, in the U.S. Pat. No. 4,469,220 to Becker, issued Sep. 4, 1984, there is disclosed a magnetic coupling assembly for driving a conveyor, and which provides a slip clutch type function between the conveyor roll and the power drive when there is an excessive accumulation of parts being transported upon the conveyor. In other words, this magnetic coupling assembly essentially serves the purpose of providing torque limiting power transmission between the driving and driven members of the conveyor.

However, the belt and pulley arrangement of Hofer et al. and the magnetic coupling assembly of Becker do not, nor does any other prior art that I am aware of, provide an effective releasability feature for the power connection. I have found that the ability to release the power connection is, in fact, one of the most important features for proper functioning of a power driven transfer assembly.

Accordingly, the focus of the efforts leading up to the present invention is on a new type of conveyor transfer assembly which feeds articles along a feed path between two conveyors, wherein the conveying surface of the conveyor transfer assembly is power or actively driven, yet the power connection is efficiently releasable in the event of an article jam or the like. It is important that the releasable power connection be simple and inexpensive to manufacture, easy to install and operate, and reliable in performing it's intended function during day-to-day operation.

With further reference to Applicant's copending application, the disclosed transfer assembly is supported freely on the conveyor support, resting only by gravity, so as to insure quick and easy pop-up release in the event of an article jam or the like. This is an important aspect of the transfer assembly and is very important in maintaining the releasability feature. Still, it is equally important to maintain a positive attachment between the transfer assembly and conveyor support to avoid a "false release" as a result of some other occurrence besides a "true article jam." In other words, it is important to make sure that the transfer assembly does not unnecessarily release due to such factors, as for example, vibration within the conveyor system, or by the weight of the articles being transported on the conveyor tending to tip the transfer assembly out of position.

One concept of providing a positive attachment of a transfer assembly, while still providing a releasable feature in the event of a jam in the conveyor system, is disclosed in U.S. Pat. No. 5,009,307 to Chance et al., issued Apr. 23, 1991. The '307 patent discloses a plate that is held in position by a frame on one end of a conveyor by using spring loaded detents on both sides of the plate. This plate is designed to be released in the event of an article or foreign object being lodged between the end of the conveyor and the plate. However, the unreliability of this type of article transfer means plays a key role in the limited acceptability that it has. In addition, the use of such spring loaded detents has several apparent disadvantages, such as, for example: (1) moving detent parts which increase the chance for mechanical failure of the mechanism; (2) decrease in strength of the spring after extended periods of use making it difficult to obtain and maintain an optimum breakaway force; and (3) difficulty in cleaning the detents when used on conveyors in industries such as food processing.

Accordingly, in addition to the need for a releasable power connection, as described above, there is also a need for a new and reliable means for maintaining a positive, but releasable attachment between a conveyor transfer assembly and the conveyor supports. As with the power connection, it is important that the means for providing the positive attachment of the transfer assembly be simple and inexpensive to manufacture, easy to install and operate, and be reliable in its day-to-day operation.

SUMMARY OF THE INVENTION

Accordingly, it is a primary object of the present invention to provide an improved conveyor transfer assembly for placement in a transfer zone between the end of a first conveyor and the start of a second conveyor which overcomes the above described limitations and shortcomings of the prior art.

Further, it is an object of the present invention to provide a conveyor transfer assembly which incorporates the ability for easy and quick pop-up release in the event of an article or foreign object causing an article jam or the like so as to prevent damage to the articles being transported upon the conveyor, as well as, prevent damage to the conveyor and conveyor transfer assembly.

Still another object of the present invention is to provide a conveyor transfer assembly wherein the conveying surface is actively driven yet still maintains the ability to disconnect the power connection and to release the conveyor transfer assembly upon the occurrence of an article jam.

Still yet another object of the present invention is to provide a conveyor transfer assembly which is positively attached to the conveyor support so as to maintain the ability for the conveyor transfer assembly to release in the event of an article jam, but to stay in position during normal operation of the conveyor system.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved conveyor transfer assembly is provided for placement downstream of a feeding portion of a first conveyor and upstream of the receiving portion of a second conveyor. The conveyor transfer assembly of my invention allows more efficient feeding of articles, such as cartons, along the conveyor system. In addition, the transfer assembly is adaptable to virtually any system wherein modular, belt-type or similar conveyors are used in an end-to-end relationship.

The conveyor transfer assembly includes a conveying surface on the top for moving the articles between the two conveyors. More specifically, in the present invention the conveying surface includes a plurality of rollers to assist the articles in making the transition across the transfer zone. Further, the rollers extend transversely across the transfer assembly and are affirmatively held in position by mounting blocks located at opposite ends of the conveyor transfer assembly.

In accordance with an important aspect of the present invention, the conveyor transfer assembly includes a means for actively driving the rollers to form an active conveying surface. The driving means should include a direct connection between an independent power source and the rollers. Advantageously, the actively driven rollers insure that the articles leaving the end of the first conveyor have sufficient momentum to reach the beginning of the second conveyor.

In accordance with yet another important aspect of the present invention, it should be appreciated that the conveyor transfer assembly is releasable. More particularly, in the event of an article jam, such as when an article/foreign object becomes lodged under the transfer assembly or the like, it is easily lifted in a pop-up fashion and thereby released before any appreciable damage to the conveyor or the articles being transferred can occur. Therefore, it is important that the means for driving the rollers be such that the releasability of the transfer assembly is maintained.

Preferably, the driving means is comprised of a magnetic coupling assembly for actively driving the conveying surface rollers. More particularly, a magnetic coupling assembly is located at the proximal end of each roller. Advantageously, the magnetic coupling assembly for driving the rollers provides the capability for releasing this power connection upon the occurrence of an article jam. Thus, this allows for the conveyor transfer assembly to be releasable while being actively driven as well.

More preferably, the magnetic coupling assembly of the present invention is comprised of two axially aligned and opposingly positioned casings which are magnetically drawn together at their faces to establish the magnetic coupling. Each casing contains a magnet recessed below the face of its casing. Advantageously, this prevents the oppositely poled magnets from coming into contact causing wear and quick deterioration during operation.

In accordance with another important aspect of the present invention, an alternate embodiment is provided which includes a magnetic coupling assembly having larger casings with multiple magnets contained within each casing. Thus, it should be appreciated that the multiple magnets allow for greater torque to be transmitted through the magnetic coupling assembly to the rollers.

In accordance with yet another aspect of the present invention, a magnetic hold-down means is provided for positively attaching the conveyor transfer assembly to the frame which spans between the end of the first conveyor and the beginning of the second conveyor. More particularly, a magnetic force is established which firmly keeps the conveyor transfer assembly in position during normal operation of the conveyor. Advantageously, when an article jam occurs, with sufficient force to overcome the magnetic force, the transfer assembly is still allowed to properly release. In addition, it should be appreciated that the magnetic hold-down means allows for the transfer assembly to be firmly held in place and to only release in the event of a "true article jam." More specifically, this prevents the conveyor transfer assembly from releasing due to such factors as vibration existing within the conveyor system, or the weight of the articles inadvertently tipping the transfer assembly out of its position.

Additionally, in accordance with still yet another aspect of the present invention, the conveyor transfer assembly includes a tether connected to the transfer assembly on one end and the conveyor support frame on the other end. Advantageously, this limits the distance that the conveyor transfer assembly may travel after being released. More particularly, this prevents the conveyor transfer assembly from continuing to travel down the second conveyor and causing damage, as well as, preventing damage to the conveyor or conveyor transfer assembly itself.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
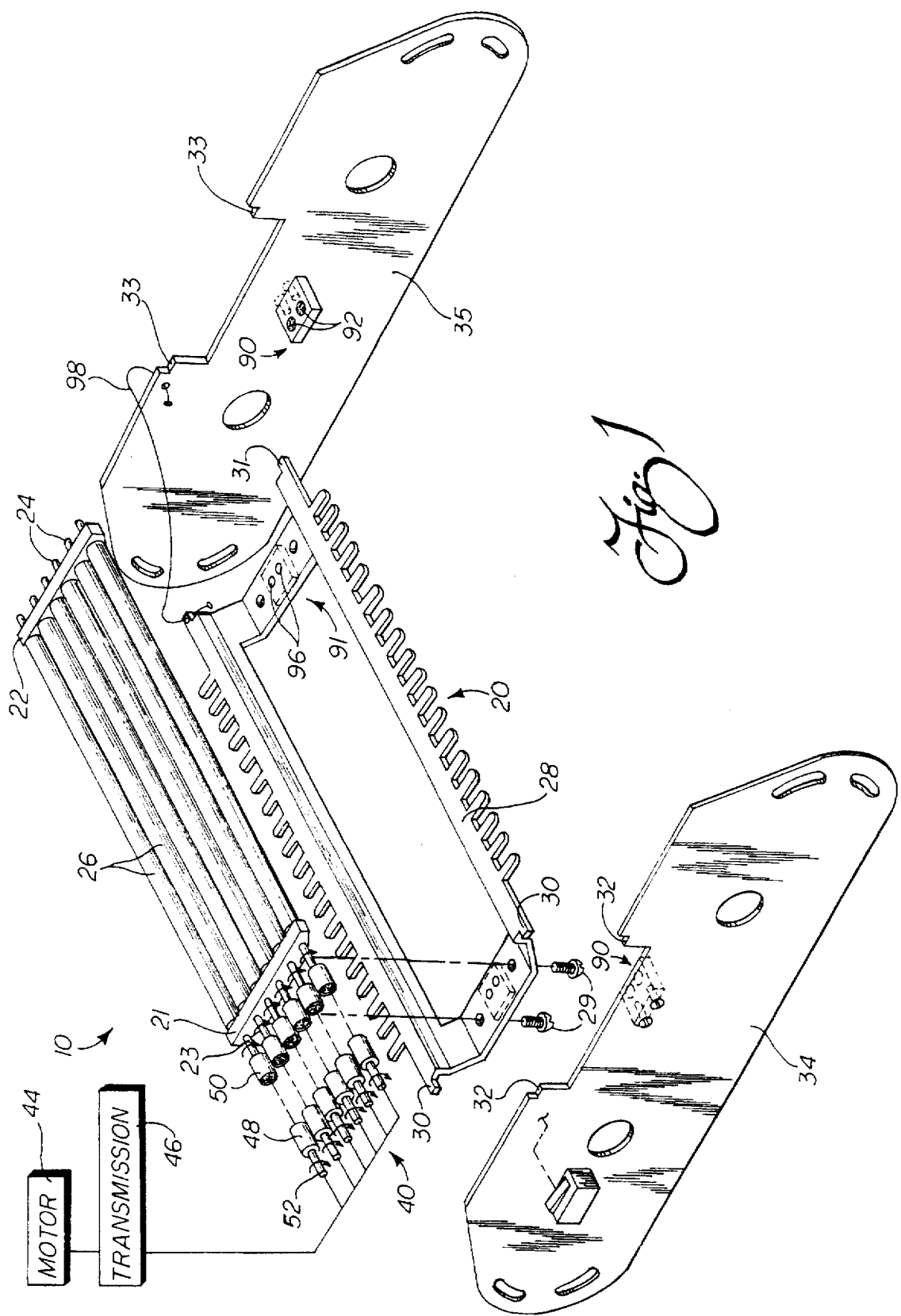
FIG. 1 is an exploded perspective view of the conveyor transfer assembly of the present invention including the magnetic coupling assembly and the side plates upon which the assembly rests when in the operative position.

Reference is now made to FIG. 1 showing the conveyor transfer assembly 10 of the present invention. As should be appreciated the transfer assembly 10 includes a support means, generally designated by the reference numeral 20. As illustrated, a pair of mounting blocks 21, 22 are provided through which the ends 23, 24 of rollers 26 extend, respectively. In addition, the support means 20 includes a recessed, open bottom pan 28 in which the mounting blocks 21, 22 are fixed by suitable fasteners 29.

At the ends of the recessed pan 28, in which the mounting blocks 21, 22 are fastened, there are provided two pairs of support tabs 30, 31. Matched with the tabs 30, 31 are respective pairs of notches 32, 33 on the upstanding side plates 34, 35 of the frame of the conveyor system.

As should be appreciated, a complete description of a releasable conveyor transfer assembly 10 and how it operates is set forth in Applicant's copending application Ser. No. 08/451,614, filed May 26, 1995 now U.S. Pat. No. 5,584,373 and entitled "Conveyor System With Passive Roller Transfer Assembly", the complete disclosure of which is incorporated herein by reference. In addition, it should be further appreciated that an important aspect of the present invention is providing a more efficient releasable conveyor transfer assembly 10 with power driven rollers. More specifically, it is important that in the event of an article jam, the transfer assembly 10 maintain the ability to be lifted in a pop-up fashion and released to prevent damage to the conveyor system and the articles being conveyed thereon.

With further reference to FIG. 1, an improvement feature of the present invention is a magnetic coupling assembly, generally designated by the reference numeral 40. The magnetic coupling assembly 40 is shown as positioned at one end of the support means 20, although it should be recognized that a similar magnetic coupling assembly could be positioned at the other end as well.

The magnetic coupling assembly 40 serves the purpose of actively driving the rollers 26, as opposed to the rollers being passive; i.e. the action of gravity moving the articles across the rollers no longer has to be relied upon according to the present invention. The rollers 26 are driven by power from an independent power source, such as a motor 44 and transmission 46 which is operatively connected to the magnetic coupling assembly 40 in any suitable manner known in the art. This driving action causes the rollers 26 of the magnetic coupling assembly to rotate, which in turn translates into positive movement of the articles on the rollers.

Advantageously, the use of actively driven rollers results in an increased number of functions that the conveyor transfer assembly 10 of the present invention is capable of performing. More specifically, driven rollers may be necessary for use in conjunction with conveyor systems transporting unusually shaped articles which would not otherwise continually roll across the rollers of a passive/gravity type conveyor transfer assembly. In addition, a conveyor transfer assembly having actively driven rollers may be used when it is necessary to traverse larger spans, level spans or even inclined spans between conveyors where, likewise, the passive/gravity type transfer assembly would not be feasible.

Figure 2:
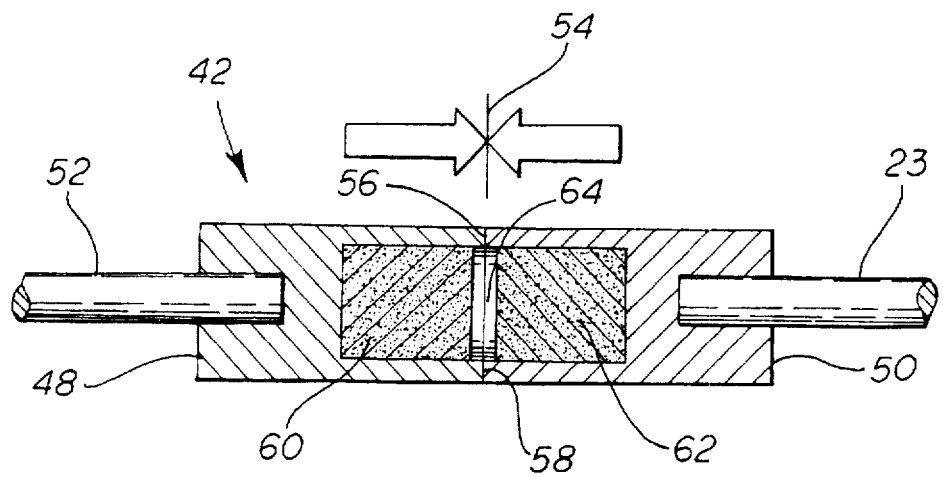
FIG. 2 is a cross sectional view of a preferred embodiment of a magnetic coupling of the transfer assembly.

As best shown in FIGS. 1 and 2, in the preferred embodiment the magnetic coupling assembly 40 includes a plurality of magnetic couplings 42; i.e. there is one magnetic coupling provided per roller 26. More specifically, each magnetic coupling 42 includes axially aligned and opposed first casing 48 and second casing 50. The first casing 48 is attached to shaft 52, which is in turn connected to any suitable drive means, such as a belt and pulley arrangement or a sprocket and chain arrangement, for delivering power from the transmission 46.

In addition, an interface, designated by the reference numeral 54 (see FIG. 2) is established between the first casing 48 and second casing 50 where their respective faces 56, 58 come into contact. Rare earth magnets 60, 62 having opposite poles are contained within casings 48, 50 creating a magnetic force which draws the casings together at the interface 54.

It should be appreciated that the magnets 60, 62 are recessed below the faces 56, 58 creating an internal gap 64. This allows for the faces 56, 58 of the casings 48, 50 to be in contact during operation of the magnetic couplings 42 while preventing direct contact between the magnets 60, 62. This prevents wear and deterioration of the magnets 60, 62 after extended periods of use.

As set forth above, an important aspect of the conveyor transfer assembly 10 of the present invention is the ability for the conveyor transfer assembly to release in the event of an article jam. Advantageously, the magnetic coupling assembly 40 effectively provides a means for actively driving the rollers 26 while still allowing for this releasability function. More specifically, in the event of an article jam, such as a foreign object/article becoming lodged adjacent the conveyor transfer assembly 10, the conveyor transfer assembly is bodily lifted and released to prevent damage. When this occurs, it should be appreciated that the individual magnetic couplings 42 simultaneously disconnect at their respective interfaces 54 and allow the conveyor transfer assembly 10 to be lifted and released as intended. Thus, when an article jam or the like occurs with sufficient force to overcome the predetermined magnetic coupling force present, the disconnecting of the magnetic couplings is accomplished.

Of course, there is immediate termination of power transmission through the magnetic couplings 42 once the conveyor transfer assembly 10 is lifted and released. More particularly, once the magnetic coupling force is overcome, the separation at each interface 54 advantageously releases the power connection.

Figure 3A:
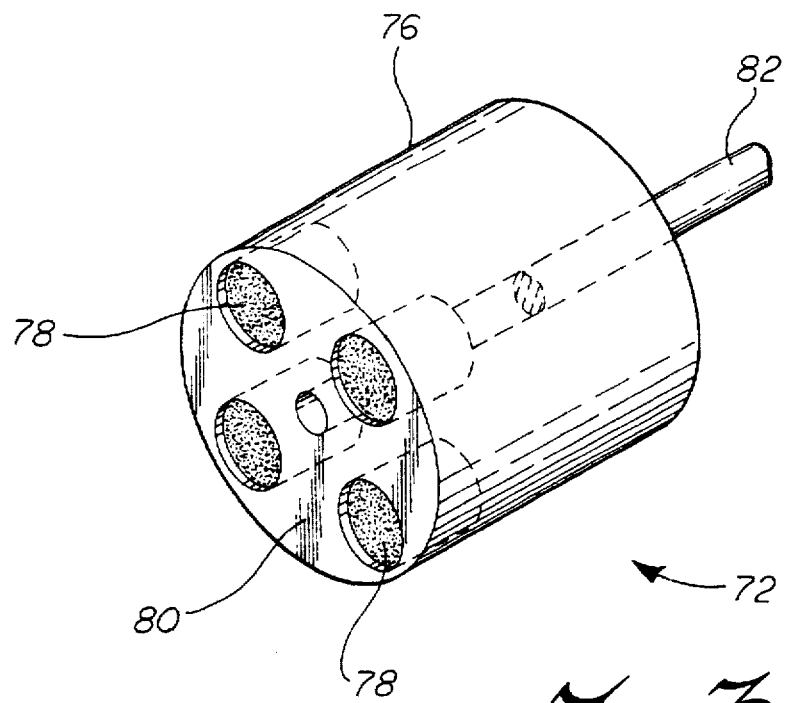
FIG. 3a is a perspective view showing one half of a magnetic coupling of the alternate embodiment containing multiple magnets for the purpose of delivering a greater amount of power to the conveying surface.
Figure 3:
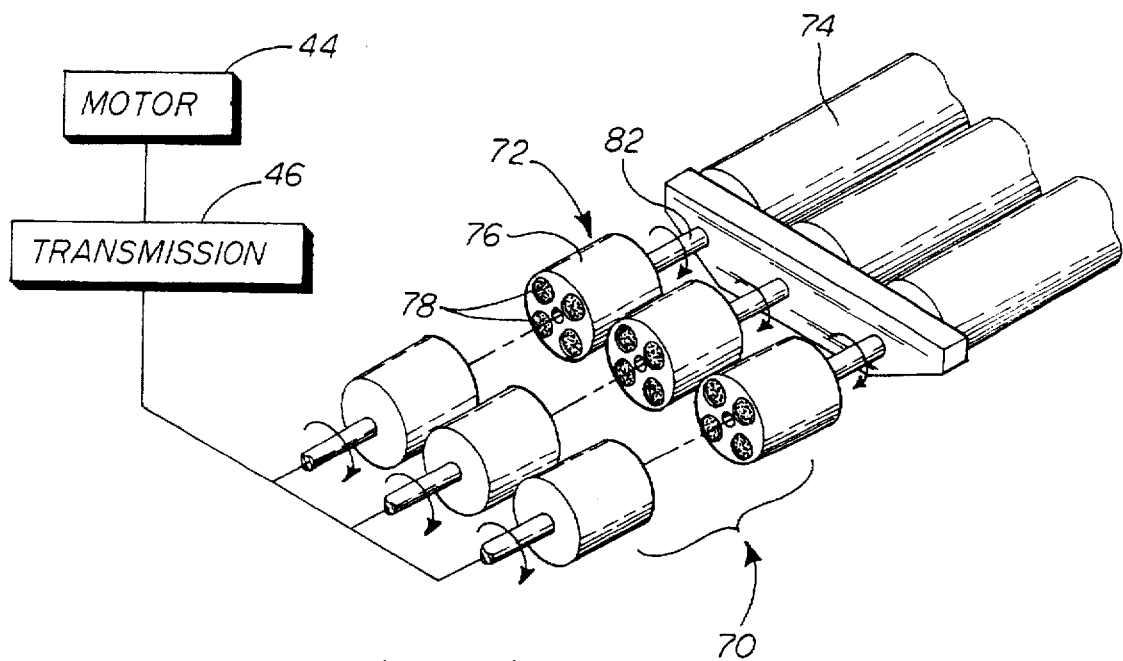
FIG. 3 is an enlarged partial perspective view showing an alternate embodiment of the coupling of the assembly of the present invention.

With reference to FIGS. 3 and 3a, an alternate embodiment of the magnetic coupling assembly 70 is provided. It operates in essentially the same manner as the preferred embodiment, as described above, and provides for all the stated advantages and improvement features. However, in this alternate embodiment, magnetic couplings 72 connected to rollers 74 are preferably larger than magnetic couplings 42 and rollers 26 of the above described preferred embodiment of FIGS. 1 and 2. In addition, as best shown in FIG. 3a, the enlarged casing 76 of each magnetic coupling 72 contains a plurality of magnets 78, as opposed to the single magnet contained in each of the casings 48, 50 of the preferred embodiment.

It should be appreciated that by providing a larger magnetic coupling 72 having multiple magnets 78, a much more powerful coupling is created for driving the larger rollers 74. Thus, when larger rollers are needed, this alternate embodiment should be used. More specifically, the increased magnetic force present in the magnetic coupling 72 allows for greater torque to be transmitted through the magnetic coupling, and accordingly larger articles can be conveyed. Also, as in the preferred embodiment, the magnets 78 are recessed below the face 80, and a shaft 82 is provided for directly connecting the casing 76 to the rollers 74.

Figure 4:
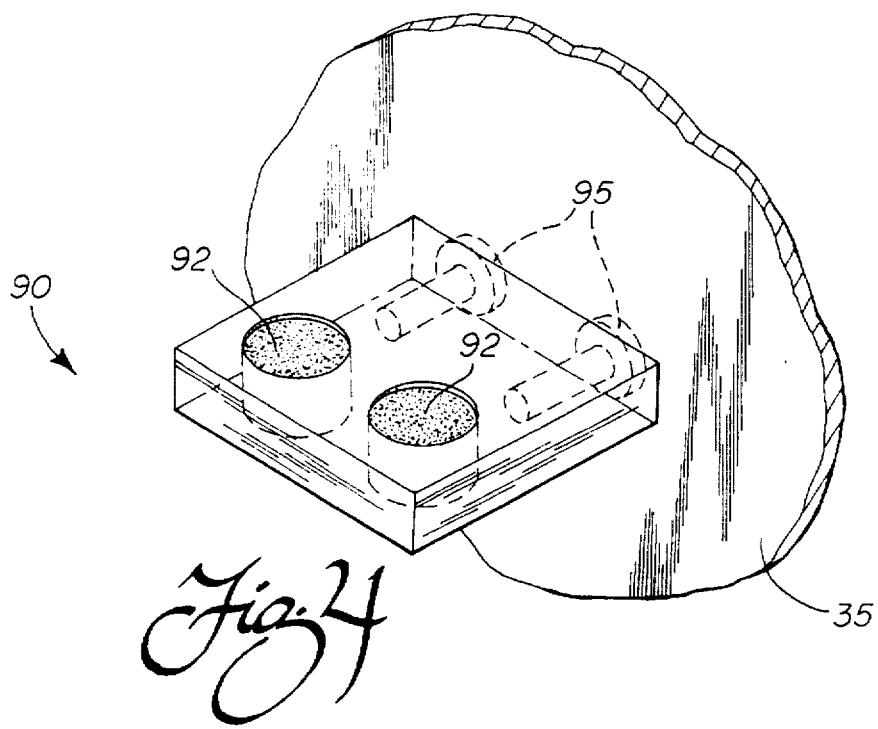
FIG. 4 is a cut-away perspective showing a magnetic hold-down pad and its position with relation to the side plate.

In addition, another improvement feature of the present invention takes the form of magnet hold-down pads 90, 91, as shown in FIGS. 1 and 4. The magnet hold-down pads 90, 91 work in conjunction to provide a positive attachment between the support means 20 and the upstanding side plates 34, 35. The importance of having such a positive attachment is to insure that the conveyor transfer assembly 10 is lifted and released only in the event of a "true article jam." More specifically, it is important that the conveyor transfer assembly 10 stay in the normal operating position to maintain the consistent flow of articles from a first conveyor to a second conveyor. Thus, the magnet hold-down pads 90, 91 act to prevent a "false release" of the conveyor transfer assembly 10. Such a "false release" could be caused by such factors as vibration which naturally occurs within the conveyor system during operation or the impact from heavier articles being transported across the conveyor transfer assembly.

The preferred magnet hold-down pad 90, as shown in FIG. 4, includes a pair of magnets 92. The pad is connected by fasteners 95 to the upstanding side plate 35. It should be appreciated that each of the mating magnet hold-down pads 91 is virtually identical to the magnet hold-down pads 90 except that magnets 96 have opposite poles from the magnets 92 so as to provide the positive attachment.

One other improvement feature of the present invention, a tether 98, is shown in FIG. 1. The tether 98 is connected at one end to support tab 31 and connected at the other end to upstanding side plate 35. The tether 98 serves the purpose of restraining or limiting the distance that the conveyor transfer assembly 10 may travel from its original position following release. Accordingly, it should be appreciated that this prevents the conveyor transfer assembly 10 from traveling downstream on the conveyor line causing damage. The tether 98 also keeps the transfer assembly suspended on the side of the conveyor to prevent damage to the transfer assembly itself.

In summary, it will be realized that an improved conveyor transfer assembly 10 is provided. More particularly, the magnetic coupling assembly 40 provides an effective and efficient means for actively driving the rollers 26 so that articles are fed across the transfer assembly 10 in a smooth and efficient manner. The magnetic coupling assembly 40 also allows for the reliable pop-up release of the transfer assembly, as well as, for the release of the power connection in the event of an article jam.

In addition, magnetic hold-down pads 90, 91 provide a positive attachment between the transfer assembly 10 and the upstanding side plates 34, 35. This ensures that the transfer assembly 10 does not unnecessarily release during routine operation. The tether 98, is provided for restraining and suspending the transfer assembly 10 upon its release.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. In a conveyor system for articles including a first conveyor having a feeding portion and a second conveyor having a receiving portion and a frame between said portions, the improvement comprising:

a conveyor transfer assembly for moving articles feeding along the system spanning between said conveyor portions;

a conveying surface formed on top of said transfer assembly for moving said articles from said feeding portion to said receiving portion;

support means of said transfer assembly positively attached to said frame;

magnet means to provide a magnetic force for establishing said positive attachment; and drive means including at least one magnetic coupling for driving said conveying surface;

whereby an article jam or the like adjacent said transfer assembly, sufficient to overcome the magnetic force provided by said magnet means and to disconnect said magnetic coupling, causes said assembly to be bodily lifted and released to prevent damage.

2. The conveyor transfer assembly in a conveyor system of claim 1, wherein said magnet means includes a first magnet positioned on said support means and a second magnet positioned on said frame, said first magnet and said second magnet being adjacent and having opposite poles so as to establish said positive attachment.

3. The conveyor transfer assembly in a conveyor system of claim 2, wherein said conveying surface includes a plurality of rollers extending transversely across said transfer assembly.

4. The conveyor transfer assembly in a conveyor system of claim 3, wherein said drive means includes a plurality of said magnetic couplings for said rollers to provide the driving action.

5. The conveyor transfer assembly in a conveyor system of claim 4, wherein said magnetic couplings include a first coupling magnet and a second coupling magnet having opposite poles and positioned such that a gap is provided so as to prevent physical contact of the magnets during the driving action.

6. The conveyor transfer assembly in a conveyor system of claim 4, wherein said magnetic couplings include multiple first coupling magnets and multiple second coupling magnets having opposite poles and positioned such that a gap is provided so as to prevent physical contact during the driving action.

7. The conveyor transfer assembly in a conveyor system of claim 1, further comprising a tether connected to said transfer assembly and connected to said frame so as to restrain and suspend said transfer assembly following the lifting and release of said assembly during a jam.

8. In a conveyor system for articles including a first conveyor having a feeding portion and a second conveyor having a receiving portion and a frame between said portions, the improvement comprising:

- a conveyor transfer assembly for articles feeding along the system spanning between said conveyor portions;
- a conveying surface formed on top of said transfer assembly for moving said articles from said feeding portion to said receiving portion; and
- drive means including at least one magnetic coupling for driving said conveying surface,
- whereby an article jam or the like adjacent said transfer assembly disconnects said magnetic coupling and causes said assembly to be bodily lifted and released to prevent damage.

9. The conveyor transfer assembly in a conveyor system of claim 8, wherein said conveying surface includes a plurality of rollers extending transversely across said transfer assembly.

10. The conveyor transfer assembly in a conveyor system of claim 9, wherein said drive means includes a plurality of said magnetic couplings for said rollers to provide the driving action.

11. The conveyor transfer assembly in a conveyor system of claim 10, wherein said magnetic couplings include a first coupling magnet and a second coupling magnet having opposite poles and positioned such that a gap is provided so as to prevent physical contact of the magnets during the driving action.

12. The conveyor transfer assembly in a conveyor system of claim 10, wherein said magnetic couplings include multiple first coupling magnets and multiple second coupling magnets having opposite poles and positioned such that a gap is provided so as to prevent physical contact during the driving action.

13. In a conveyor system for articles including a first conveyor having a feeding portion and a second conveyor having a receiving portion and a frame between said portions, the improvement comprising:

- a conveyor transfer assembly for articles feeding along the system spanning between said conveyor portions;
- a conveying surface formed on top of said transfer assembly for moving said articles from said feeding portion to said receiving portion;
- support means of said transfer assembly positively attached to said frame; and
- magnet means to provide a magnetic force for establishing said positive attachment,
- whereby an article jam or the like adjacent said transfer assembly, sufficient to overcome the magnetic force provided by said magnet means, causes said assembly to be bodily lifted and released to prevent damage.

14. The conveyor transfer assembly in a conveyor system of claim 13, wherein said magnet means includes a first magnet positioned on said support means and a second magnet positioned on said frame, said first magnet and said second magnet being adjacent and having opposite poles so as to establish said positive attachment.

* * * * *